(12) United States Patent
Czech et al.

(10) Patent No.: US 11,081,758 B2
(45) Date of Patent: Aug. 3, 2021

(54) COVER FOR A BATTERY HOUSING OF A HIGH-VOLTAGE VEHICLE BATTERY AND BATTERY HOUSING

(71) Applicant: AUDI AG, Ingolstadt (DE)

(72) Inventors: Marvin Czech, Ingolstadt (DE); Christoph Kreutzer, Ingolstadt (DE); Andreas Deindl, Großmehring (DE)

(73) Assignee: AUDI AG, Ingolstadt (DE)

( * ) Notice: Subject to any disclaimer, the term of this patent is extended or adjusted under 35 U.S.C. 154(b) by 101 days.

(21) Appl. No.: 16/410,104

(22) Filed: May 13, 2019

(65) Prior Publication Data

US 2019/0348653 A1 Nov. 14, 2019

(30) Foreign Application Priority Data

May 14, 2018 (DE) .......................... 102018207409.7

(51) Int. Cl.
| | |
|---|---|
| *H01M 50/24* | (2021.01) |
| *H01M 50/20* | (2021.01) |
| *B60K 1/04* | (2019.01) |
| *B60L 50/64* | (2019.01) |

(52) U.S. Cl.
CPC .......... *H01M 50/24* (2021.01); *H01M 50/20* (2021.01); *B60K 1/04* (2013.01); *B60K 2001/0438* (2013.01); *B60L 50/64* (2019.02); *B60Y 2200/91* (2013.01); *B60Y 2400/112* (2013.01); *H01M 2220/20* (2013.01)

(58) Field of Classification Search
CPC ............. H01M 2/1094; H01M 2/1072; H01M 2220/20; H01M 2200/00; H01M 2/02; H01M 2/04; H01M 2/0478; H01M 2/0486; H01M 2/0482; B60Y 2400/112; B60Y 2200/91; B60K 2001/0438; B60K 1/04; Y02E 60/10; Y02T 10/70
See application file for complete search history.

(56) References Cited

U.S. PATENT DOCUMENTS

| | | | | |
|---|---|---|---|---|
| 2005/0281999 | A1* | 12/2005 | Hofmann | C08J 9/236 428/304.4 |
| 2009/0130530 | A1* | 5/2009 | Tanaka | H01M 8/2483 429/515 |
| 2013/0164567 | A1* | 6/2013 | Olsson | H01M 10/425 429/7 |
| 2015/0221914 | A1* | 8/2015 | Page | H01M 2/1016 429/82 |

(Continued)

FOREIGN PATENT DOCUMENTS

| | | |
|---|---|---|
| DE | 102013200546 A1 | 7/2014 |
| DE | 102013200560 A1 | 7/2014 |

(Continued)

OTHER PUBLICATIONS

German Search Report dated Apr. 26, 2019 in corresponding German Application No. 10 2018 207 409.7; 24 pages.

*Primary Examiner* — Brian R Ohara
(74) *Attorney, Agent, or Firm* — Maier & Maier, PLLC

(57) ABSTRACT

A cover for a battery housing of a high-voltage vehicle battery. The cover includes a composite material which for its part comprises a polymer matrix and an at least fire retardant material embedded in said polymer matrix. In addition, the cover includes an electrically conductive layer which forms an electromagnetic shield.

9 Claims, 1 Drawing Sheet

(56) References Cited

U.S. PATENT DOCUMENTS

2016/0226114 A1* 8/2016 Hartmann ............ H01M 10/658
2017/0365824 A1* 12/2017 Berger ................ H01M 2/0202

FOREIGN PATENT DOCUMENTS

| DE | 102014110307 A1 | 1/2016 |
| DE | 102015209519 A1 | 11/2016 |
| DE | 102016207320 A1 | 11/2017 |
| GB | 2519067 A | 4/2015 |

* cited by examiner

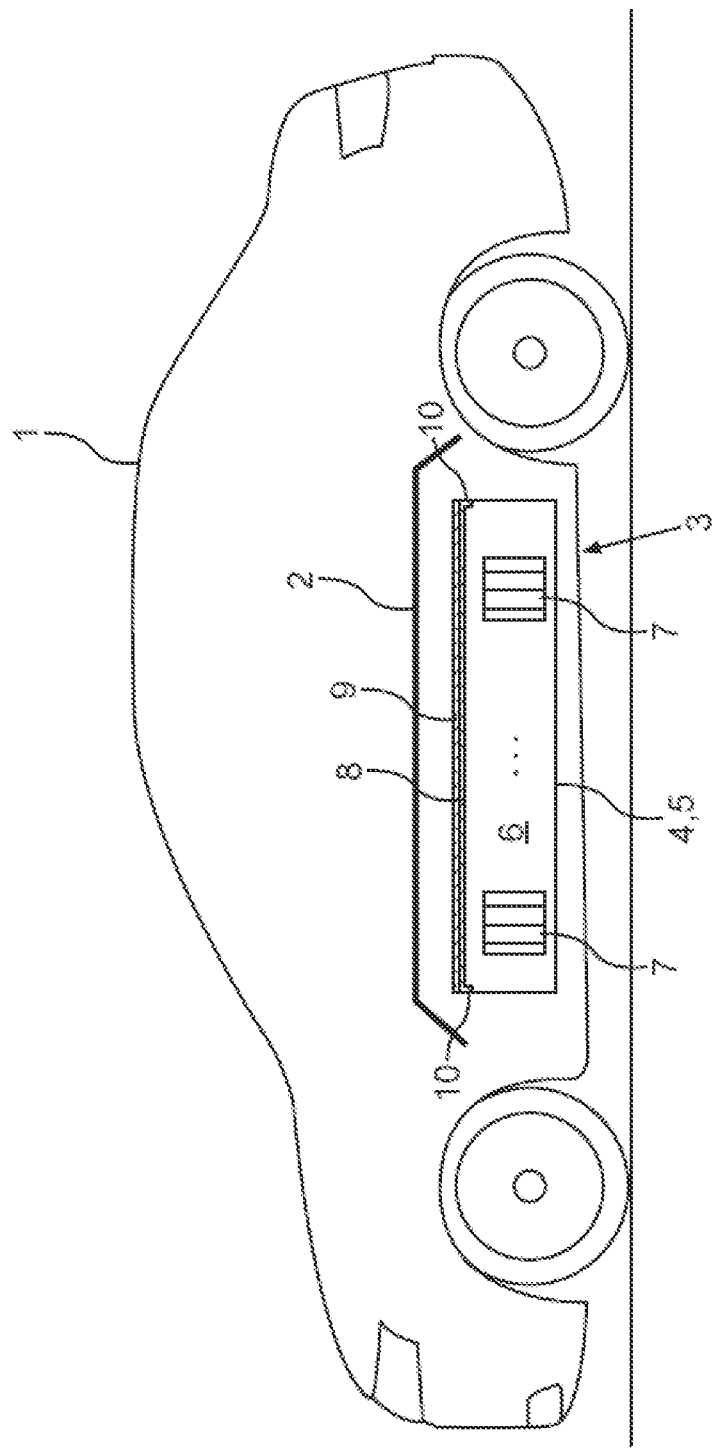

COVER FOR A BATTERY HOUSING OF A HIGH-VOLTAGE VEHICLE BATTERY AND BATTERY HOUSING

FIELD

The disclosure relates to a cover for a battery housing of a high-voltage vehicle battery and to a corresponding battery housing with such a cover. Below, a high-voltage vehicle battery—here also referred to in short as a high-voltage battery or traction battery—should be understood to mean in particular a battery for a motor vehicle, in particular for an electric vehicle, which provides an electrical output voltage between 200 V and 1000 V at maximum state of charge.

BACKGROUND

In order to satisfy today's requirements and needs, the energy content and the energy density of today's high-voltage batteries are increasing as technological progress continues to be made in battery technology. This entails an increasing hazard or risk potential, since, in case of failure or a damaged high-voltage battery, correspondingly more energy can be released. In the high-voltage batteries available today, in the case of damage to the respective high-voltage battery, significant damage can also be caused in a respective environment of the high-voltage battery. For example, hot gases can be discharged from high-voltage batteries and/or fire can even occur in principle. Conventional battery housings made of a plastic material are often not able to cope with this hazard potential.

In addition, with increasing output voltage or operating voltage of the high-voltage batteries, the electrical insulation requirements also increase. Thus, in particular when metallic materials or components are used, sufficient air gaps or creeping distances and a sufficient electronic shield must be taken into consideration or ensured. This can have a negative effect on a geometric structure of the high-voltage battery, for example, in the form of additional space requirement. Overall, compliance with the safety requirements of current and future high-voltage batteries associated with a particularly small installation space and weight constitutes a significant technical challenge.

DE 10 2015 209 519 A1 discloses a composite component comprising a fiber-reinforced plastic component and a metal part for producing a mechanical fastening. The metal part is here connected by force-locking, firm bonding and/or form-fit connection to the fiber-reinforced plastic. The composite component has at least one connection device for mechanical fastening of a seat to the composite part. In this way, economic producibility with low weight and sufficiently high strength is to be achieved.

DE 10 2013 200 560 A1 describes a battery with a housing and a cover assembly which is connected to an opening of the housing and comprises a cover plate which covers the opening of the housing. Here it is provided that a connection between the cover plate and the housing comprises an adhesive joint with a sealant. The sealant is introduced in a liquid phase into the adhesive joint. Subsequently, the liquid phase of the sealant is converted to a solid phase. Thereby, certain predetermined sealing requirements are to be satisfied while nevertheless achieving that the housing can be opened safely and more easily for the purpose of disassembly or repair.

SUMMARY

The aim of the present disclosure is to indicate a possibility for a particularly safe and at the same time compact and easy closure of a battery housing.

A cover for a battery housing of a high-voltage vehicle battery according to the invention comprises a composite material. According to the invention it is provided that the composite material comprises a polymer matrix and an at least fire retardant material embedded in said matrix. Moreover, according to the invention it is provided that the cover has an electrically conductive layer which forms an electromagnetic shield. Due to the fact that the at least fire retardant material is integrated in the polymer matrix, the cover according to the invention at the same time offers an improved protection against heat and fire in comparison to conventional plastic covers and an advantageously reduced weight in comparison to conventional full-metal covers. The at least fire retardant material can be, for example, at least of fire resistance class F 30. Preferably, the at least fire retardant material can be extremely fire retardant according to fire resistance class F 60, fire resistant according to the fire resistance class F 90, or extremely fire resistant according to the fire resistance class F 180. The fire retardant material can be sprinkled as a powder into the polymer matrix, when this polymer matrix is in a liquid or partially liquid state during a production process of the cover or of the composite material. The electrically conductive layer can be designed, for example, in the form of an aluminum film applied to the composite material.

Preferably, most of the cover, for example at least 80% of a total material of the cover based on volume and/or weight, is made of the composite material. In particular, it is preferably provided that the composite material extends over a total area or expanse in a main extension plane or main extension surface of the cover. In other words, the cover is then formed at least substantially from the composite material. Thus, with the exception of the electrically conductive layer and an optionally provided seal, the cover can preferably be formed entirely from the composite material. This does not affect the fact that, for example, fastening means for fastening the cover to or on the battery housing can be made of another material, for example, in the form of metallic screws.

The high-voltage battery can be divided or partitioned in terms of system technology into a storage portion and an electronic portion. The storage portion or high-voltage storage portion here comprises battery cells or battery modules comprising in each case multiple battery cells, in which the energy is stored. The electronic portion can comprise, for example, fuses, capacitors, control devices such as, for example, a battery management controller (BMC), a cell management controller (CMC), a module management control (MMC), a contactor, printed circuit boards, connections and/or the like and be referred to, for example, as a battery junction box (BJB). The storage portion and the electric portion can be arranged in their own or separate housings or housing portions of the high-voltage battery. The cover according to the invention is then used in particular for covering the storage portion, that is to say the battery cells or battery modules.

By using the polymer-based composite material, it is advantageously not necessary to provide, in addition, air gaps or creeping distances, since the composite material is in particular electrically non-conductive or insulating. Thus, for example, a particularly compact and thus installation space-saving construction of both the cover and also of the battery housing or of the high-voltage battery can be achieved overall. The electrically conductive layer can thus be insulated by the composite material itself with respect to other electrical components of the high-voltage battery. Since the fire protection is achieved by the composite material, the electrically conductive layer, in particular the metallic layer, can be designed to be particularly thin and thus particularly light, that is to say weight-saving, since it can be or needs to be designed exclusively for providing the electromagnetic shield. By the combination of the composite material with the electrically conductive layer, the cover according to the invention can thus meet today's requirements with regard to fire protection and also with regard to electromagnetic compatibility (EMC) particularly effectively and efficiently.

An additional advantage of the cover according to the invention consists in that the electrically conductive layer, that is to say the electromagnetic shield, is connected to the composite material, so that the cover can be produced as an individual component or as a cohesive assembly. Thereby, a particularly easy handling, logistics and installation capability of the cover is possible, since both the fire protection and also the electromagnetic shield or compatibility can be achieved by mounting the individual component or the individual cohesive assembly—namely the cover according to the invention—in a single work process or work step during the production of the high-voltage battery. Thereby, the two safety aspects can be implemented or ensured in a particularly reliable manner, since, for example, a source of error which can exist in correct arrangement or relative orientation of two separate components, one of which is provided for fire protection and the other for establishing the electromagnetic compatibility, can be avoided.

Due to the low metal proportion of the cover according to the invention in comparison to conventional full-metal covers and the facilitated mounting capability, cost savings can be achieved advantageously in the production of the high-voltage battery.

In an advantageous design of the present invention, the electrically conductive layer is applied on a top side of the composite material, which, when the cover is installed in the correct position on the battery housing, faces away from the inner space which is then enclosed by the battery housing and the cover. In other words, the electrically conductive layer is thus applied on an outer side of the cover. Thereby, advantageously, not only is the electromagnetic shield reliably ensured, but also the non-conductive or insulating composite material, which faces the inner space and thus the battery cells arranged therein, is thereby used as electrical insulation between the inner space and the electrically conductive layer. In addition, the composite material can thus advantageously be protected by the electrically conductive layer, in particular metallic layer, against damage, aging, decomposition and the like. In addition, the electrically conductive layer can sealingly close potentially present pores of the composite material and thus ensure or improve a fluid-tightness of the cover. The electrically conductive layer can, for example, be electroplated on the top side of the composite material or, for example, glued, laminated or sprayed on. Particularly preferably, the electrically conductive layer can be made of aluminum. By coating the composite material with aluminum, a reliable corrosion protection of the cover can advantageously be achieved. The electrically conductive layer can be designed, for example, in the form of a film having, for example, a thickness of 0.2 mm to 0.5 mm, for example.

In an advantageous alternative design of the present invention, the electrically conductive layer is formed as a mat embedded in the polymer matrix. In other words, the electrically conductive layer can thus be, for example, a meshwork or a woven fabric or a knitted fabric made of fibers, for example, metallic fibers. These fibers can then be woven or interwoven to form the mat. By embedding or inserting this mat in the polymer matrix, advantageously a particularly stable and reliable connection of the electrically conductive layer to the composite material can be achieved. Particularly preferably, the mat is arranged here in an upper region, for example, in an upper half or an upper fourth, of the composite material. The upper region here is the region facing the upper side or outer side of the cover, that is to say the region of the cover or of the composite material which, when the cover is installed in the correct position on or at the battery housing, faces away from the inner space, that is to say away from the battery cells of the high-voltage battery. Thereby, advantageously, the lower region of the composite material, which is arranged between the mat and the inner space, can furthermore ensure a sufficient electric insulation of the electrically conductive layer with respect to the inner space of the battery housing or the battery cells of the high-voltage battery which are arranged therein. In particular, it is provided that the at least fire retardant material is arranged at least in this lower region of the composite material as well. Thereby, even in case of failure or one or more damaged battery cells, the electromagnetic shield can be ensured or maintained as long as possible.

In an advantageous design of the present invention, the polymer matrix comprises a resin, for example, an epoxy resin, and/or a silicone. Here, it is provided that the at least fire retardant material comprises a mica mineral, in particular in powder form. In other words, the polymer matrix can thus be made of the resin and/or silicone and the at least fire retardant material can be made of a mineral from the mica group. Due to this combination of materials, advantageously a particularly reliable fire protection with particularly low weight can be implemented.

In an additional advantageous design of the present invention, the composite material comprises, as the at least fire retardant material or as part of the at least fire retardant material, aramid fibers, in particular fibers made of a meta aramid. Thereby as well, advantageously, a reliable fire protection with particularly low weight can be implemented. The at least fire retardant material can consist exclusively of the aramid fibers or comprise multiple components. Thus, for example, it is possible that, as the at least fire retardant material, both aramid fibers and also the mentioned mica mineral can be provided as part of the composite material.

In an additional advantageous design of the present invention, the composite material comprises an intumescent or intumescing portion. Additionally or alternatively, it is provided that the cover according to the invention comprises an intumescent or intumescing layer. By means of the intumescent portion or the intumescent layer, with exposure to heat, as can occur in case of failure or one or more damaged battery cells of the high-voltage battery, but not in the normal failure-free operation of the battery cells, an expansion, swelling or foaming is brought about, whereby a fire protection duration of the cover according to the invention can advantageously be increased. For this purpose, the cover or a composite material can comprise, for example, expanded graphite and an ashing insulation material. Likewise, the cover or a composite material can comprise hydrates which have an endothermic effect, that is to say, for example, which have or can exert a cooling effect due to water vapor release. Moreover, by means of the intumescent portion or the intumescent layer, due to the increase in the volume thereof, a particularly reliable sealing of the inner space of the battery housing can advantageously be achieved. Intumescent or intumescing materials, components or building materials are also referred to as intumescent coatings.

In an additional advantageous design of the present invention, it is provided that the composite material, in particular the at least fire retardant material, is resistant, that is to say temperature stable, at least up to a temperature of 700° C. In other words, the composite material or the at least fire retardant material is thus designed to withstand a temperature of at least 700° C., at least for a predetermined time span of at least ten minutes, for example. This can be achieved by a selection of the at least fire retardant material, by its proportion or density in the composite material and/or by a thickness of the composite material. Depending on the combination of these measures, the requirement according to the invention can be satisfied in various ways. By the design of the composite material, the cover according to the invention can meet today's requirements with regard to the fire protection of high-voltage batteries or in corresponding motor vehicles advantageously in a large number of different cases of failure of the respective high-voltage battery.

In another advantageous design of the present invention, the cover according to the invention is designed to withstand temperatures of 800° C. to 1,100° C. for at least ten minutes, so that within this time, no gas passes through the cover. In other words, the cover is thus designed to be temperature stable, so that, within a time span of at least ten minutes, during which the cover is exposed to a temperature of 800° C. to 1,100° C., said cover does not form any perforations or holes. Thereby, hazardous situations such as those that can occur in the case of damage in current and future high-voltage batteries can advantageously be contained, that is to say spatially localized, isolated or limited, long enough to enable respective occupants of the motor vehicle to move safely away from the motor vehicle or the damaged high-voltage battery. This requirement according to the invention can also be met overall by a corresponding design of the cover with regard to the material selection of the at least fire retardant material, the density, distribution and/or quantity thereof in the composite material, and the thickness or strength of the composite material or of the cover.

In an additional advantageous design of the present invention, the cover comprises an elastomer seal arranged peripherally in an edge region of the cover. In other words, the elastomer seal is integrated in the cover or arranged or attached on the cover so that the cover including the seal forms an assembly which can be handled and mounted as an individual part. The elastomer seal can be applied, for example, on the cover, in particular on a lower side or on an edge of the cover, for example, sprayed or foamed on. Likewise, the elastomer seal can be attached or become attached by means of a formed-in place method.

The fact that the elastomer seal is designed peripherally means that the elastomer seal extends along a periphery or, for example, at least substantially parallel to a periphery of the cover and in the process preferably forms a closed ring. The edge region of the cover can here comprise side surfaces of the cover extending at least substantially perpendicularly to a main extension plane or a main extension surface of the cover. Likewise, the edge region can comprise a subregion of a lower side of the cover, in particular an annular outer subregion which thus adjoins the outer periphery of the cover. The lower side here faces away from or is located opposite the already-mentioned upper side of the cover or of the composite material and can in particular form a main extension surface of the cover, that is to say can extend at least substantially parallel to a main extension plane of the cover. Because the cover comprises the elastomer seal, advantageously a particularly cost-effective production and a particularly simple and low-cost mounting of the high-voltage battery can be achieved. Because the elastomer seal is attached to the cover or is provided as part of the cover, it is possible, for example, to dispense with an expensive manual orientation of a molded gasket often used for conventional battery housings. Thus, an additional source of error can be avoided and in the end safety and reliability of the entire battery housing or of the high-voltage battery can be improved overall.

In an additional advantageous design of the present invention, the polymer matrix, in an edge region of the cover, comprises a peripheral molding which forms a seal which, when the cover is installed in the correct position on or at the battery housing, enables a sealing contact between the cover and the rest of the battery housing. In other words, the seal is thus formed by the polymer matrix or the composite material itself. Thus, the seal forms an integral component of the cover. Thereby, the possibility of gas or material being able to pass through between the seal and the cover is in principle excluded, since there is no contact surface at which the seal, as a separate component, lies on the cover. Thus, in the end, a sealing and reliability of the entire battery housing or of the high-voltage battery can be improved overall. In addition, a separate seal as a separate component can be dispensed with, resulting not only in cost savings but in particular also in a particularly simple, cost-effective and low-cost handling and mounting capability of the cover. The edge region can here be the already-described edge region of the cover or correspond thereto in terms of its arrangement.

An additional aspect of the present invention is a battery housing for a high-voltage battery, in particular for a traction battery, of a motor vehicle. The battery housing according to the invention here has a housing body which is open on one side and a cover according to the present invention for closing off the housing body on the open side thereof. In other words, the cover, in its correct installation position, is arranged as part of the battery housing on the housing body and closes off the open side thereof, so that the housing body and the cover together enclose an inner space of the battery housing. The battery housing according to the invention can in particular be the battery housing mentioned in connection with the cover according to the invention. Depending on the context, the battery housing mentioned in connection with the cover according to the invention can also mean the housing body of the battery housing according to the invention.

The invention also comprises the combinations of the features of the described embodiments both of the cover according to the invention and of the battery housing according to the invention.

The invention also covers developments of the battery housing according to the invention which have features that are as described in connection with the developments of the cover according to the invention and vice versa. In order to avoid unnecessary redundancy, the corresponding developments of the battery housing according to the invention and of the cover according to the invention are not explicitly described again here separately.

BRIEF DESCRIPTION OF THE DRAWINGS

Below, embodiment examples of the invention are described.

FIG. 1 shows a diagrammatic cross-sectional side view of an electric vehicle with a high-voltage battery.

DETAILED DESCRIPTION

The embodiment examples explained below are preferred embodiments of the invention. In the embodiment examples, the described components of the embodiments in each case represent individual features of the invention, which are to be considered independently of one another, which in each case also develop the invention independently of one another and thus should also be considered to be part of the invention individually or in other combinations than the combination shown. Moreover, others of the already-described features of the invention can be added to the described embodiments.

The single FIGURE shows a diagrammatic cross-sectional side view of an electric vehicle 1. In a lower region of, in the vertical direction of the motor vehicle, the electric vehicle 1 comprises a shell or support structure 2. Farther below this support structure 2, the electric vehicle 1 comprises a floor plate 3 which forms a lower floor 1 of the electric vehicle 1. Between the support structure 2 and the floor plate 3, a high-voltage battery is arranged, which is preferably a traction battery 4 of the electric vehicle 1. The traction battery 4 has a housing body 5 which is open upward in the vertical direction of the vehicle, that is to say it has a tub-shaped or tub-like form. The housing body 5 encloses or at least partially surrounds a receiving space or inner space 6. In this inner space 6, a plurality of individual battery cells 7 of the traction battery 4 are arranged, of which only some are indicated diagrammatically here.

In case failure or damage, it is possible for hot gases to be discharged from the traction battery system, that is to say here, for example, from the traction battery 4, potentially leading to a fire. Combustible materials can lead to fire propagation. The traction battery in the present case has an output voltage of 200 V to 800 V. In the case of such electrical voltages or voltage classes, air gaps and creeping distances have to be taken into consideration in conventional traction battery systems, in particular when the metallic components are used. Additionally or alternatively, electrically insulating materials must be used. Moreover, due to electromagnetic emission of the traction battery 4 or in order to avoid electrical interferences in the traction battery 4 and/or in other electrical components of the electric vehicle 1, electromagnetic shielding measures must be taken in today's battery systems. In order to protect the traction battery 4 against environmental influences, the inner space 6 in addition must be sealed off.

For this purpose, in conventional batteries, for example, plastic covers or metal covers are used for closing off the respective housing body 5. Due to the increasing energy density or the increasing energy content of today's traction batteries 4 and the energy potentially released in case of failure or a damaged traction battery 4, the materials used to date often cannot provide enough protection against fire to protect a passenger compartment of the electric vehicle 1. Although materials for protection against hot gases and flames are known, they are often not suitable for outside applications, that is to say, for example, they are not resistant to weathering influences and/or organic influences such as, for example, fungal infestation or the like. With regard to the electromagnetic shielding or the electromagnetic compatibility, a design of the traction battery 4 is limited to a use of metallic materials. However, due to the necessary air gaps and creeping distances, the use of metallic materials can then lead to a space requirement which also increases with increasing voltage of the traction battery 4.

For sealing conventional high-voltage batteries, for example, fluid seals are provided so far, which have to be applied at great expenditure, or molded gaskets are provided, which, particularly due to the increasing size of today's traction batteries 4, also lead to a high production expenditure and in the end to high costs.

In order to circumvent these problems, in the present case, as part of the traction battery 4, a multifunctional hybrid cover, referred to here in short as cover 8, is provided. The cover 8 tightly closes off the housing body 5 on its open side and together with the housing body 5 thus forms a closed battery housing of the traction battery 4. The cover 8 is made of a polymer matrix in which an at least fire retardant material is embedded, and of an electrically conductive layer 9. Moreover, the cover 8 comprises a peripheral seal 10 which enables or establishes an at least fluid-tight contact between the cover 8 and the housing body 5. Due to this design of the cover 8, an improved fire protection and an electromagnetic shield with particularly low weight and particularly compact design as well as particularly easy handling and mounting of the cover 8 and cost savings in comparison to conventional high-voltage battery or battery housings are achieved.

The invention claimed is:

1. A cover for a battery housing of a high-voltage vehicle battery, comprising:
   a composite material formed from a polymer matrix and an at least one fire retardant material embedded in said polymer matrix,
   wherein the cover has an electrically conductive layer applied to a top side of the composite material, which, when the cover is installed in a correct position on the battery housing, the top side faces away from an inner space which is enclosed by the battery housing and the cover,
   wherein the electrically conductive layer is between 0.2 mm and 0.5 mm thick, forms an electromagnetic shield suitable for shielding the high-voltage vehicle battery, and sealingly closes any pores of the composite material so as to ensure a fluid-tightness of the cover,
   wherein at least 80% of the cover by volume or weight is formed from the polymer matrix,
   wherein the cover closes off the housing in a fluid-tight manner.

2. The cover according to claim 1, wherein the electrically conductive layer is designed as a woven fiber mat embedded in the polymer matrix.

3. The cover according to claim 1, wherein the polymer matrix comprises a resin and/or a silicone, and
   the at least one fire retardant material comprises a mica mineral in powder form.

4. The cover according to claim 1, wherein the composite material comprises, as the at least one fire retardant material or as part of the at least one fire retardant material, aramid fibers made of a meta aramid.

5. The cover according to claim 1, wherein the composite material comprises an intumescent portion and/or the cover comprises an intumescent layer.

6. The cover according to claim 1, wherein the composite material, in particular the at least one fire retardant material, is resistant up to a temperature of 700° C.

7. The cover according to claim 1, wherein the cover is designed to withstand a temperature of 800° C. to 1,100° C. for at least ten minutes, so that, within this time, no gas passes through the cover.

8. The cover according to claim 1, wherein the cover comprises an elastomer seal arranged about a peripheral edge of the cover so as to seal the cover with an outer edge of the battery housing.

9. The cover according to claim 1, wherein in an edge region of the cover, the polymer matrix has a peripheral molding which forms a seal which, when the cover is installed in the correct position on the battery housing, enables a sealing contact between the cover and the battery housing.

* * * * *